Nov. 3, 1959  R. ROSEBROOK  2,910,967
NUMERICALLY CONTROLLED MACHINE TOOL
Filed June 28, 1957  4 Sheets-Sheet 1

INVENTOR.
ROY ROSEBROOK
BY
D. Gordon Angus
ATTORNEY.

Nov. 3, 1959  R. ROSEBROOK  2,910,967
NUMERICALLY CONTROLLED MACHINE TOOL
Filed June 28, 1957  4 Sheets-Sheet 2

INVENTOR.
ROY ROSEBROOK
BY
D. Gordon Angus
ATTORNEY.

Nov. 3, 1959   R. ROSEBROOK   2,910,967
NUMERICALLY CONTROLLED MACHINE TOOL
Filed June 28, 1957   4 Sheets-Sheet 3

INVENTOR.
ROY ROSEBROOK
BY
D. Gordon Angus
ATTORNEY.

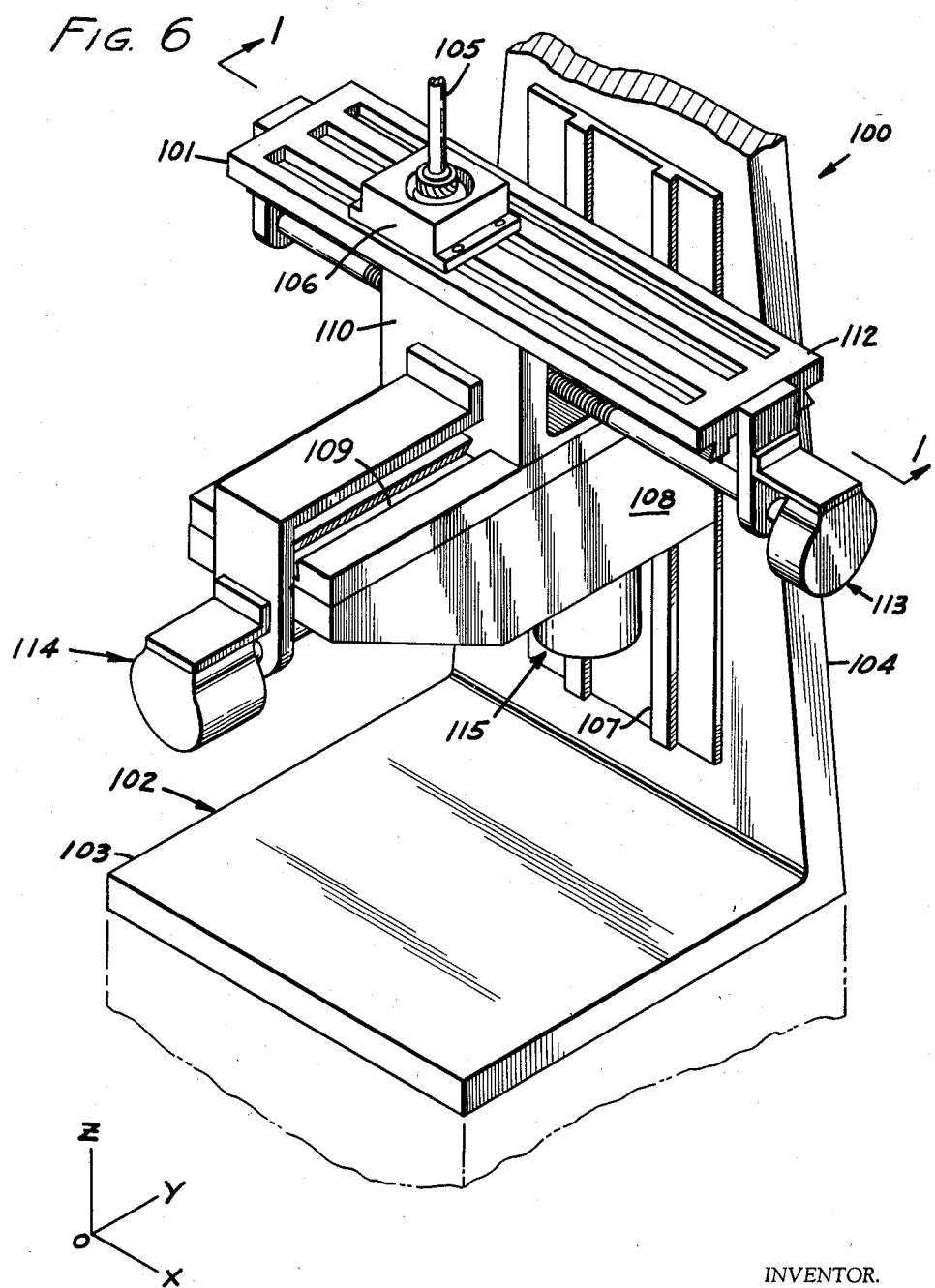

United States Patent Office 2,910,967
Patented Nov. 3, 1959

2,910,967
NUMERICALLY CONTROLLED MACHINE TOOL

Roy Rosebrook, Montebello, Calif., assignor to True-Trace Corporation, El Monte, Calif., a corporation of California Application June 28, 1957, Serial No. 668,650

3 Claims. (Cl. 121—41)

This invention relates to the control of machine tools by numerical signals.

An object of this invention is to provide a control for a machine tool which enables a pair of machine tool members to be moved relatively to each other by some desired distance. A control of this type is useful, for example, in moving a slide on a milling machine, and such a control can be applied to any desired number of slides or shafts so as to control movement in any desired number of axes. As a further example, the control can be applied to the longitudinal or cross slide of a lathe, or both. A command for the desired movement may conveniently be numerical in nature, such as a signal obtained from a rotating shaft, wherein the angular rotation of the shaft is proportional to the desired relative movement of the machine tool members in the particular axis governed by said control.

This invention is carried out in combination with a machine tool which has a pair of members which are to be relatively positioned in order to machine objects to a desired shape. Motive means are provided for relatively shifting the said members, and the control system of this invention provides a means for controlling said motive means to accomplish the desired tool movement. This invention resides in signal, control and feed-back means, which together direct the application of power to said motive means, and assure a correct obedience to the signal.

According to this invention, a signal shaft is rotatably journaled in mounts which are attached to one of said machine tool members. The shaft is restrained to move axially with the member to which it is journaled. This signal shaft bears an advancing thread.

A control means includes a switch that may be a hydraulic selector valve or an electric switch, as two examples. The switch includes a reference element which is mounted to the other machine tool member so as to move therewith, and a shiftable element which engages the thread on the signal shaft. The shiftable element is keyed against rotation, so that it moves axially along the said signal shaft when the said shaft is rotated.

In the operation of this device, a suitable signal for movement of the machine tool member consists of rotation of the signal shaft. Such rotation shifts the said shiftable element axially so as to actuate the switch. In turn the switch permits energizing of the motive means, which thereupon operate to move the movable member of the machine tool. As the movable member shifts, the signal shaft and the reference element also move relatively to each other. The said shiftable element, being engaged to the thread, moves axially with the shaft. This moves the said shiftable element axially toward a central or null position, at which position the control means no longer passes power to the motive means. The return of the said shiftable element to a central position re-establishes the control means in a neutral or null position, and thereby provides feed-back means for checking compliance with the signal.

Accordingly, this invention contemplates signal means effective upon a control means, such as a hydraulic selector valve, to direct energy to a motive means. It further contemplates a feed-back means wherein the relative movement of the machine tool members tends to restore the control means to a null condition when the command is carried out.

The above and other features of this invention will be fully understood from the following detailed description and the accompanying drawings, of which:

Fig. 6 is an isometric view showing a milling machine equipped for three dimensional movement under the control of apparatus of the type shown in Figs. 1–3.

Figure 1:
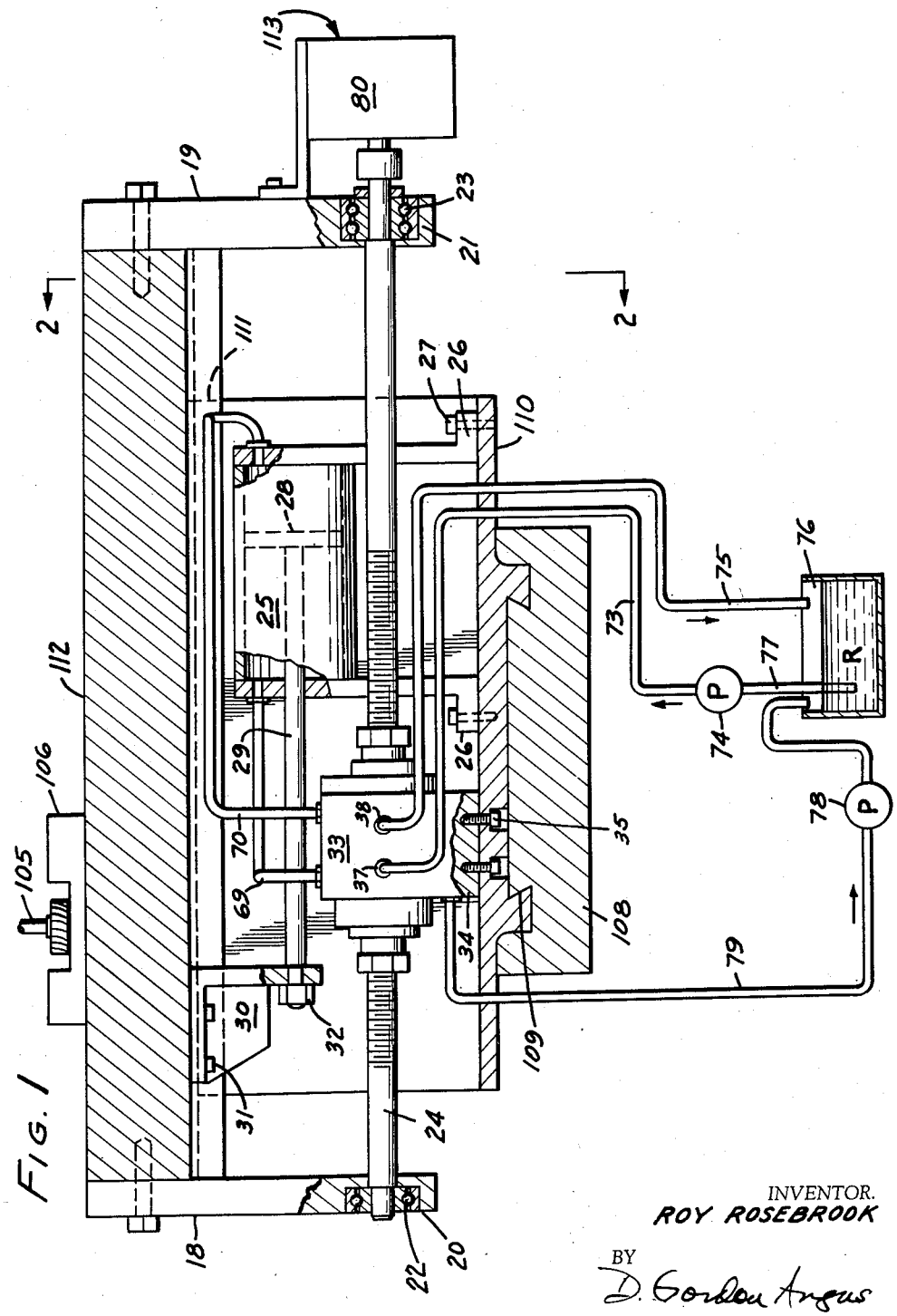
Fig. 1 is a fragmentary cross-section, partly in elevation, taken at lines 1—1 in Figs. 2 and 6.

In Fig. 6 there is shown a milling machine 100 having a work table 101 adapted for movement in three dimensions. Three axes of relative movement X, Y and Z in orthogonal relationship are shown in Fig. 6. These cartesian coordinate axes meet at an origin O. The bed 102 of the mill has a base 103 resting on a foundation. A support column 104 suspends a cutter 105 and also means (not shown) for driving the said cutter. After the tool set-up is once made, the cutter and the machine tool bed are immovable relative to each other. For the cutter to machine a contour into a workpiece 106 which is mounted to the table, the table is shifted as appropriate, and the controls according to this invention are provided for this purpose.

The support column includes Z-axis ways 107. A Z-axis slide 108 is keyed to these ways. Slide 108 is often called a knee.

Y-axis ways 109 are formed atop the knee. A Y-axis slide 110 is keyed to these ways.

X-axis ways 111 (shown in Figs. 1 and 2) are formed atop the Y-axis slide. An X-axis slide 112 is keyed to these ways.

The above three slides are each independently movable along their own axes, and movement of any slide along its axis shifts the workpiece relative to the cutting tool and the bed by the same distance. This invention provides a control for causing such movement to occur. It will be observed that each slide is a machine tool member which is movable relative to the member bearing the ways to which it is keyed. The X-axis slide is movable relative to the Y-axis slide along the X-axis; the Y-axis slide is movable relative to the Z-axis slide along the Y-axis; and the Z-axis slide is movable relative to the support column along the Z-axis.

Control means 113 controls the aforesaid movement of the X-axis slide. Control means 114 controls the aforesaid movement of the Y-axis slide. Control means 115 controls the aforesaid movement of the Z-axis slide. Control means 113 are shown in full detail in Figs. 1–3, it being understood that control means 114 and 115 are similar in all details, and control movements in their respective axes.

Figure 2:
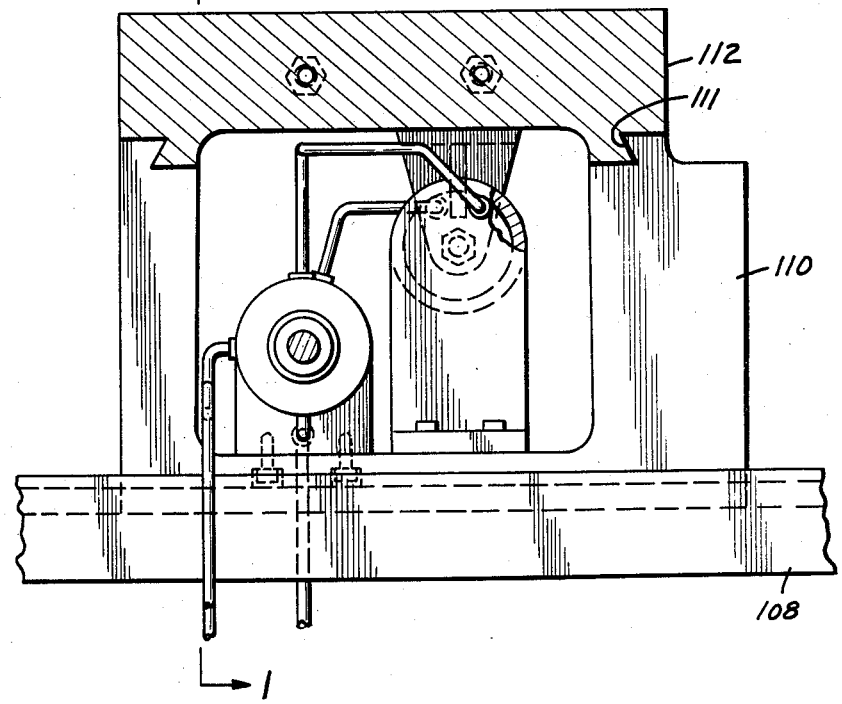
Fig. 2 is a cross-section taken at line 2—2 of Fig. 1.

As best shown in Fig. 1, the X-axis slide 112 is provided with an apron 18, 19, at each end thereof. These aprons hold journals 20, 21 which include bearings 22, 23, respectively.

A signal shaft 24 is mounted to the bearings so that it is rotatable therein. This shaft is parallel to the X-axis. It will be observed that the X-axis slide 112 and the Y-axis slide 110 comprise two machine tool members whose position relative to each other is to be adjusted, and that the signal shaft is rotatably mounted to the X-axis slide, and is restrained thereto so as to move axially with said X-axis slide.

As an example of a suitable motive means, a hydraulic motor is illustrated in Fig. 1. This motor is a piston and cylinder assembly, although other types such as rotary motors could also have been used.

A hydraulic cylinder 25 is mounted by means of flanges 26 and bolts 27 to the Y-axis slide 110. A piston 28 is shiftable within the hydraulic cylinder 25 so as to reciprocate a rod 29 which is attached to the piston. The rod 29 is also attached to the X-axis slide 112 by means of a bracket 30 which is fixed to the X-axis slide by bolts 31. A nut 32 threaded onto the free end of the rod 29 holds the bracket and rod together. It will now be seen that by means of appropriate reciprocation of the piston in the cylinder, the X-axis slide can be shifted with respect to the X-axis slide in the direction of the X-axis.

Control means 33 are provided for the purpose of causing this desired shifting of the X-axis slide. These control means are shown in greater detail in Fig. 3 to which reference should now be had. They comprise a hydraulic selector-valve which acts as a switch. Its purpose is to direct hydraulic fluid under pressure to a selected side of the piston within the cylinder and to permit the escape of hydraulic fluid from the other side thereof, when the X-axis slide is to be shifted. For this purpose, the base 34 of the control means is attached by bolts 35 to the Y-axis slide. This base holds within it a reference element, or valve sleeve, 36. The base 34 has a pressure conduit 37, an exhaust conduit 38, and a suction conduit 39 therein. These three conduits open into a sleeve passage 40 in said base. The valve sleeve 36 is pressed into the sleeve passage 40. The exhaust conduit 38 has two branches 41, 42, which are spaced on opposite sides of the pressure conduit 37 at the sleeve passage. The suction conduit 39 has two branches 43, 44 which are on opposite sides of the branches 41 and 42.

The valve sleeve is provided with a pressure port 45 which makes fluid connection with pressure conduit 37 at the sleeve passage and opens into a spool passage 46 within the valve sleeve. Exhaust ports 47 and 48 extend through the sleeve from the spool passage to the sleeve passage, and connect with exhaust branches 41 and 42, respectively, so that exhaust ports are disposed on axially opposite sides of the pressure port 45 from each other.

Suction ports 49, 50 extend between the sleeve passage and spool passage and interconnect with the suction branches 43, 44, respectively.

A valve spool 51 is axially slidably disposed within the spool passage 46. For ease in manufacture and service, the spool, the sleeve passage and the spool passage, are all circular cylinders. This valve spool is the "shiftable element" of the control means which engages the thread on the signal shaft. It is shiftable relative to the "reference member" i.e. the valve sleeve.

The valve spool and the valve sleeve 36 have a common central axis 52 and are relatively axially movable. The spool has a circumferential pressure groove 53 and a pair of circumferential exhaust grooves 54, 55. The exhaust grooves are disposed on opposite sides of the pressure grooves and are spaced therefrom.

The pressure groove 53 is always in fluid communication with the pressure port 45 within operating limits of the movement of the valve spool. The exhaust grooves 54, 55 are respectively in communication with exhaust ports 47 and 48 within said operating limits.

Figure 3:
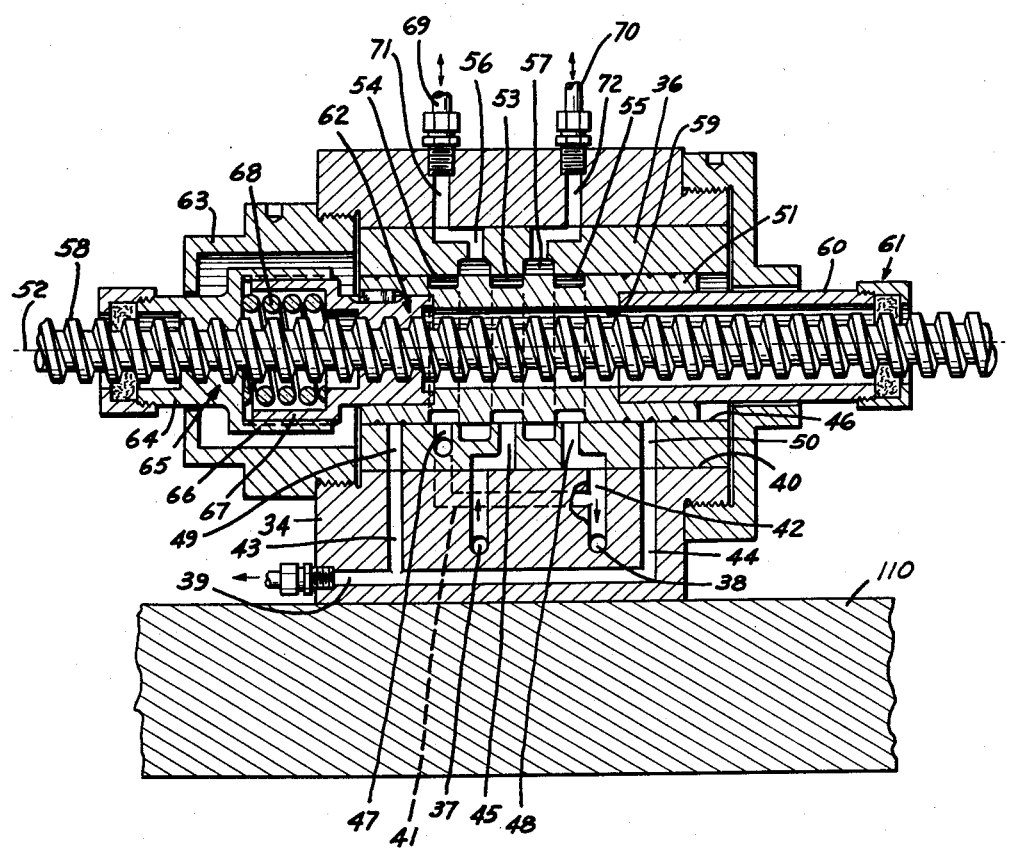
Fig. 3 is an enlarged view of a portion of Fig. 1 partly in cut-away cross-section.

A pair of cylinder supply grooves 56, 57 is formed in the sleeve. Grooves 56 and 57 are selectively connected to pressure groove 53 or one or the other of exhaust grooves 54 or 55 depending on the axial position of the spool in the sleeve. At a null, reference, position as shown in Fig. 3, the pressure port and the pressure groove are in registration and the respective exhaust ports and exhaust grooves are in registration. The cylinder supply grooves do not then register with any spool groove. Thereafter, shifting the spool in either direction will cause one of the exhaust grooves to connect with a cylinder supply groove. The pressure supply groove will at the same time register with the other cylinder supply groove.

The signal shaft has an advancing thread 58 thereon. This signal shaft passes through a shaft passage 59 within the valve spool. A tubular spool extension 60 is press-fitted to the valve spool at its right hand end as shown in Fig. 3. This extension has tooth means 61 for engaging the said advancing thread. At the left hand end of the valve spool, second tooth means 62 are attached to the valve spool, and also engage the advancing thread. Back-lash eliminating means are provided on the device which include a retainer 63 threaded to the base 34 through which retainer the signal shaft passes. A tubular element 64 having third tooth means 65 is fitted within the said retainer. The tubular element 64 has a flange 66 which telescopes with a flange 67 on tooth means 62. A coil spring 68 is opposed between the said tubular element 64 and the second tooth means 62 so that the second tooth means 62 and third tooth means 65 are urged apart. This arrangement maintains the spool in a single relationship relative to the thread on the signal shaft by eliminating back lash. The term "tooth means" includes any means for making engagement with the signal shaft, and includes screw threads, or portions thereof, which means serve to make a direct threaded engagement between the valve spool and the signal shaft.

Cylinder supply conduits 69, 70 extend from cylinder supply ports 71, 72, respectively, to connect to the hydraulic cylinder 25 on opposite sides of the piston. Cylinder supply ports 71, 72 connect with cylinder supply grooves 56, 57, respectively.

A pressure conduit 73 (see Fig. 1) receives hydraulic fluid under pressure from a pump 74 and introduces the same to the pressure conduit 37. An exhaust conduit 75 receives fluid from exhaust conduit 38 and returns the same to a reservoir 76 from which the pump withdraws fluid through conduit 77.

In addition, a suction pump 78 withdraws seepage fluid from the valve through conduits 39, 43 and 44, and returns the same to the reservoir through conduit 79.

Signal means 80 are shown schematically in Fig. 1. Such signal means are provided for the purpose of turning the signal shaft in angular increments which are proportional in direction and amount to the distance by which the elements of the machine tool are to be relatively shifted. There are many known devices for this purpose, among which may be mentioned stepping switches, and differential devices wherein the opposed rotations of two motors through a differential gearing produce a resultant rotation of the signal shaft 24.

The above components, including signal shaft, motive means, signal source, and switch, which have been described in connection with X-axis control means 113 are duplicated in Y-axis control means 114 and Z-axis control means 115. The signal shafts in these latter two control means will be aligned parallel to the axis in the direction of the respective relative movements. Signals provided by the respective signal sources will then move the elements the desired distance in the appropriate directions.

Figure 4:
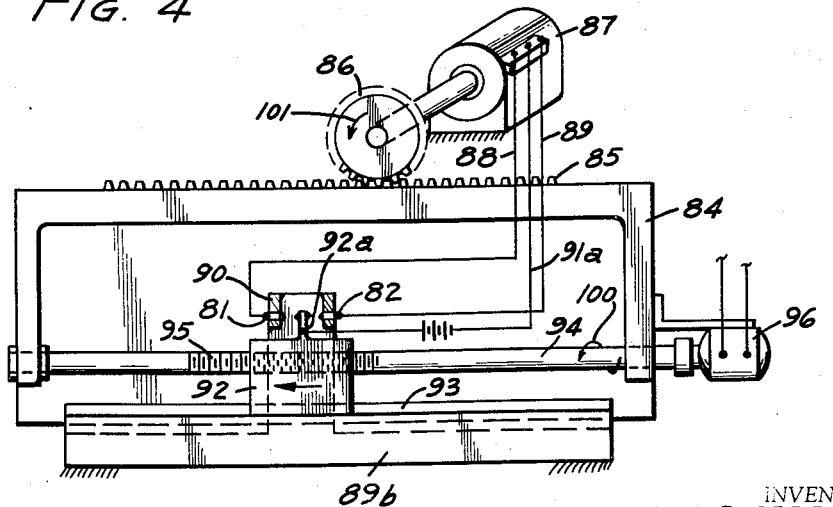
Fig. 4 is a schematic illustration of a portion of still another embodiment of the invention.

Fig. 4 further illustrates the fact that in essence, the control means of this device comprises a switch which has a null position and two active positions, thereby being suitable for moving the numbers of the machine tools in one direction or in the other, or keeping the members relatively stationary. In Fig. 4, a machine tool member 84 is shown which has a rack gear 85 on the relatively movable member. This rack gear is engaged by a drive gear 86 which is coupled to a bi-directional electric motor 87 which acts as motive means. This electrical motor has a pair of leads 88, 89 which attach to terminals 81, 82, respectively. Terminals 81, 82 are placed on a reference element. The reference element is mounted by a pedestal 90 to the relatively stationary member 89b. A common return lead 91a connects to a contact 92a on a shiftable element 92 which engages an advancing thread 95 on a signal shaft 94. It is obvious that limit switches, or other types of circuit-closing means could have been used instead of the above. The shiftable element 92 (which is conveniently an internally threaded collar) is held against rotation by a keyway 93 which permits it to be moved axially along the signal shaft 94 when the shaft is turned. The signal shaft is driven by signal means 96.

Figure 5:
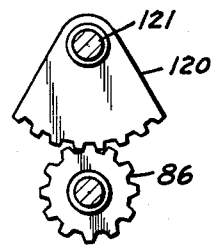
Fig. 5 is a fragmentary view of a means for adapting the apparatus of Fig. 4 for the control of rotational movement around an axis.

Fig. 5 is a schematic illustration of a means whereby this device can control a rotational movement around an axis. The mechanism illustrated shows gear 86 of Fig. 4 driving a sector gear 120 which is pinned to a shaft 121. The central axis of shaft 121 is an axis around which rotation is to be controlled for such means as tilting a work table or the workpiece. The remainder of the mechanism of Fig. 4 may be used to control rotation of gear 86.

The operation of the control means in Fig. 1 will now be described. The machine is shown at rest in a previously adjusted relative position of the members 110 and 112. Assume now that it is desired to move the X-axis slide 112 of the mill by a given increment of distance which might be .001 inch. The pitch of the advancing thread could have been selected so that one full rotation of the signal shaft will move the spool axially by .001 inch. Any other desired pitch could have been used instead. In fact, ordinarily a longer pitch will be preferred, and then a lesser angular rotation will cause the same shift of the spool. Whatever the pitch, there is a definite relationship between the distance the spool moves axially and the angular rotation of the signal shaft. If the pitch is 0.001", and a movement of 0.001" is desired, then the signal shaft will be rotated on full turn. Assume this to be a turn in the counterclockwise direction looking to the left along Fig. 1. This will move the spool to the left in Figs. 1 and 3, thereby moving the pressure supply groove 53 into registration with the cylinder supply groove 56 and passing pressurized fluid from conduit 73 through pressure port 45, pressure supply groove 53, cylinder supply groove 56 and conduit 69 to the left hand side of the piston 28.

At the same time, exhaust groove 55 registers with cylinder supply groove 57, and receives fluid from the right hand end of the cylinder 25, which fluid is returned through conduits 48, 38 and 75 to reservoir 76. This will move the piston and the X-axis slide to the right in Fig. 1. In so doing, the signal shaft itself is moved to the right and by virtue of its threaded connection to the spool, moves the spool with it to the right, returning the spool to its null position where the pressure supply groove 53 is no longer in registration with either cylinder supply groove. It will thereby be appreciated that the interconnection between the cross slide and the spool through the signal shaft provides a feed-back system by which the obedience of the control means to the command of the signal means can be checked.

Machine movement in the other direction is caused by rotating the signal shaft in a clockwise direction by an appropriate amount, whereby the spool is moved to the right. The pressure supply groove then registers with cylinder supply groove 57. Exhaust groove 54 registers with cylinder supply groove 56. Pressure is thereby supplied to the right hand end of the cylinder, and the left hand end connects to the reservoir.

The operation of the system of Fig. 4 is similar. Turning shaft 94 in the direction of arrow 100 moves portion 92 to the left to touch contact 81. This completes a motor circuit through leads 88 and 92a to turn the gear 86 as shown by arrow 101. Member 84 is thus moved to the right, thereby tending to restore the reference portion to a null condition. Reverse rotation of the signal shaft causes a circuit to be completed through leads 89 and 92a, thus reversing the relative movement.

In Fig. 5, shaft 121 is turned by an angular amount which is proportional to the rotation of gear 86. Gear 86 is, of course, responsive to signal-controlled movement of rack 85. By means of this arrangement, rotational movement around an axis can be carried out. In this embodiment, the signal shaft, while perpendicular to the axis of shaft 121 is tangential to the movement of gear 120. In this sense, it is aligned with the direction of movement thereof. It will be understood that the essence of the arrangement of Fig. 5 is driving a gear mounted to a shaft by means of a gear engagement with a longitudinally movable machine element. Therefore this means of controlling rotational movement is useful not only with the device of Fig. 4, but also with that of Fig. 1, if gear 86 were engaged to X-axis slide 112, for example.

This invention thus provides a simple and rugged machine tool control system of great accuracy, wherein the sole signal needed is a simple turning of a shaft in proportion to a desired change of position. The feed-back means assure obedience to the signal.

It will be understood that, while the invention has been shown in connection with a mill, it is also useful on a wide range of machine tools, such as shapers, lathes and the like, wherein one machine tool member is to be positioned relative to another to control the position of a cutting tool relative to a workpiece.

This invention is not to be limited by the embodiments shown in the drawings and described in the description, which are given by way of example and not of limitation, but only in accordance with the scope of the appended claims.

I claim:

1. Apparatus for adjusting the relative position of two members of a machine tool along an axis of relative movement along which one of said members is movable relative to the other comprising: a hydraulic piston, rod, and cylinder assembly aligned with said axis of relative movement, the rod being affixed to the piston and to one of said members, and the cylinder being affixed to the other of said members; a signal shaft; an exterior advancing thread around said signal shaft; means mounting said signal shaft to a first one of said members so that the signal shaft is aligned with said axis, is constrained against axial movement relative to the member to which it is mounted, and is rotatable to turn the thread as a screw; a hydraulic selector valve comprising a sleeve mounted to a second one of the members and restrained against axial movement relative to the member to which it is mounted, a wall in said sleeve defining a cylindircal spool passage which is aligned with the said axis, a cylindrical valve spool axially slidably disposed in, and closely fitting in, said spool passage, said valve spool having a shaft passage therethrough, the signal shaft entering said shaft passage, tooth means on said valve spool in direct threaded engagement with the thread on said signal shaft so that rotating the signal shaft shifts the valve spool axially relative to the signal shaft, valve sleeve, and the member to which the signal shaft is mounted, a pressure supply groove, a pair of cylinder supply grooves, and a pair of exhaust ports in the wall defining the spool passage, the pressure supply groove being disposed axially between the cylinder supply grooves, and the cylinder supply grooves being disposed axially between the exhaust ports; a circumferential pressure groove and a pair of circumferential exhaust grooves in the cylindrical portion of the valve spool, the pressure groove in the spool being disposed between the exhaust grooves, the pressure groove in the valve spool being in registration with the pressure supply groove in the valve sleeve when the spool is in a central position in the sleeve, and remaining in registration therewith when the spool is axially shifted in either direction within operating limits of the selector valve, the pressure groove in the spool overlapping a first one of the said cylinder supply grooves, and a first one of the exhaust grooves overlapping a first one of the exhaust ports and a second one of the cylinder supply grooves when the spool is axially shifted in one direction, the pressure groove of the spool overlapping said second cylinder supply groove, and the second one of the exhaust grooves overlapping said first cylinder supply groove and a second one of the exhaust ports when the spool is shifted in the other direction; a first conduit interconnecting the first cylinder supply groove with the interior of the said cylinder on one side of the piston; a second conduit interconnecting the second cylinder supply groove with the interior of the said cylinder on the opposite side of the piston; the pressure supply groove in the valve sleeve being adapted to receive hydraulic fluid under pressure, and the said exhaust ports being adapted to discharge spent hydraulic fluid; whereby turning said signal shaft shifts the spool, thereby causing the pressure groove on the spool to register with one cylinder supply groove, and an exhaust groove to register with the other cylinder supply groove and an exhaust port, thus admitting hydraulic fluid to the cylinder so as to shift the piston, thereby shifting one member relative to the other said movement and relatively shifting the valve sleeve and valve spool toward a central position to stop said flow of hydraulic fluid.

2. Apparatus according to claim 1 in which signal means are provided for rotating said signal shaft in increments which are proportional to the desired relative shifting of the machine tool elements.

3. Apparatus for adjusting the relative position of two members of a machine tool along an axis of relative movement along which one of said members is movable relative to the other comprising: a hydraulic piston, rod, and cylinder assembly aligned with said axis of relative movement, the rod being affixed to the piston and to one of said members, and the cylinder being affixed to the other of said members; a signal shaft; an exterior advancing thread around said signal shaft; means mounting said signal shaft to a first one of said members so that the signal shaft is aligned with said axis, is constrained against axial movement relative to the member to which it is mounted, and is rotatable to turn the thread as a screw; a hydraulic selector valve comprising a sleeve mounted to a second one of the members and restrained against axial movement relative to the member to which it is mounted, a wall in said sleeve defining a cylindrical spool passage which is aligned with the said axis, a cylindrical valve spool axially slidably disposed in, and closely fitting in, said spool passage, said valve spool having a shaft passage therethrough, the signal shaft entering said shaft passage, tooth means on said valve spool in direct threaded engagement with the thread on said signal shaft so that rotating the signal shaft shifts the valve spool axially relative to the signal shaft, valve sleeve, and the member to which the signal shaft is mounted, a pressure supply groove, a pair of cylinder supply grooves, and a pair of exhaust ports in the wall defining the spool passage, the pressure supply groove being disposed axially between the cylinder supply grooves, and the cylinder supply grooves being disposed axially between the exhaust ports; a circumferential pressure groove and a pair of circumferential exhaust grooves in the cylindrical portion of the valve spool, the pressure groove in the spool being disposed between the exhaust grooves, the pressure groove in the valve spool being in registration with the pressure supply groove in the valve sleeve when the spool is in a central position in the sleeve, and remaining in registration therewith when the spool is axially shifted in either direction within operating limits of the selector valve, the pressure groove in the spool overlapping a first one of the said cylinder supply grooves, and a first one of the exhaust grooves overlapping a first one of the exhaust ports and a second one of the cylinder supply grooves when the spool is axially shifted in one direction, the pressure groove of the spool overlapping said second cylinder supply groove, and the second one of the exhaust grooves overlapping said first cylinder supply groove and a second one of the exhaust ports when the spool is shifted in the other direction; a first conduit interconnecting the first cylinder supply groove with the interior of the said cylinder on one side of the piston; a second conduit interconnecting the second cylinder supply groove with the interior of the said cylinder on the opposite side of the piston; the pressure supply groove in the valve sleeve being adapted to receive hydraulic fluid under pressure, and the said exhaust ports being adapted to discharge spent hydraulic fluid; whereby turning said signal shaft shifts the spool, thereby causing the pressure groove on the spool to register with one cylinder supply groove, and an exhaust groove to register with the other cylinder supply groove and an exhaust port, thus admitting hydraulic fluid to the cylinder so as to shift the piston, thereby shifting one member relative to the other said movement and relatively shifting the valve sleeve and valve spool toward a central position to stop said flow of hydraulic fluid; and anti-backlash means in engagement with the valve spool and the thread, said anti-backlash means comprising: a tubular element surrounding said signal shaft; tooth means in said tubular element for engaging the thread on said signal shaft; key means engaging said spool and tubular element for restraining said tubular element against rotation relative to the spool, but permitting axial movement relative thereto; and spring means opposed between said spool and tubular element forcing said spool and element away from each other.

References Cited in the file of this patent

UNITED STATES PATENTS

| 2,068,889 | Roehm et al. | Jan. 26, 1937 |
| 2,628,539 | Neergaard | Feb. 17, 1953 |
| 2,710,934 | Senn | June 14, 1955 |

UNITED STATES PATENT OFFICE
CERTIFICATE OF CORRECTION

Patent No. 2,910,967

November 3, 1959

Roy Rosebrook

It is hereby certified that error appears in the printed specification of the above numbered patent requiring correction and that the said Letters Patent should read as corrected below.

Column 3, line 20, for "X-axis", first occurrence, read -- Y-axis --; column 5, line 39, for "on" read -- one --; column 6, line 54, for "cylindircal" read -- cylindrical --.

Signed and sealed this 11th day of April 1961.

(SEAL)
Attest:

ERNEST W. SWIDER
Attesting Officer

ARTHUR W. CROCKER
Acting Commissioner of Patents